(12) United States Patent
Jia (10) Patent No.: US 9,307,267 B2
(45) Date of Patent: Apr. 5, 2016

(54) TECHNIQUES FOR SCALABLE DYNAMIC DATA ENCODING AND DECODING

(75) Inventor: Wei Jia, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1224 days.

(21) Appl. No.: 12/332,345

(22) Filed: Dec. 11, 2008

(65) Prior Publication Data

US 2010/0150244 A1 Jun. 17, 2010

(51) Int. Cl.
| | |
|---|---|
| H04N 7/12 | (2006.01) |
| H04N 19/86 | (2014.01) |
| H04N 19/159 | (2014.01) |
| H04N 19/176 | (2014.01) |
| H04N 19/172 | (2014.01) |
| H04N 19/134 | (2014.01) |
| H04N 19/102 | (2014.01) |
| H04N 19/61 | (2014.01) |
| H04N 19/156 | (2014.01) |
| H04N 19/436 | (2014.01) |

(52) U.S. Cl.
CPC ............. *H04N 19/86* (2014.11); *H04N 19/102* (2014.11); *H04N 19/134* (2014.11); *H04N 19/156* (2014.11); *H04N 19/159* (2014.11); *H04N 19/172* (2014.11); *H04N 19/176* (2014.11); *H04N 19/436* (2014.11); *H04N 19/61* (2014.11)

(58) Field of Classification Search
CPC ............................................... H04N 19/00278
USPC ................... 375/240.25, 240, 240.01, 240.24
See application file for complete search history.

(56) References Cited

U.S. PATENT DOCUMENTS

| | | |
|---|---|---|
| 5,163,136 A | 11/1992 | Richmond |
| 5,189,671 A | 2/1993 | Cheng |
| 5,585,931 A | 12/1996 | Juri et al. |
| 5,774,206 A | 6/1998 | Wasserman et al. |
| 5,796,743 A | 8/1998 | Bunting et al. |
| 5,818,529 A | 10/1998 | Asamura et al. |
| 5,821,886 A | 10/1998 | Son |
| 5,881,176 A | 3/1999 | Keith et al. |
| 5,969,750 A | 10/1999 | Hsieh et al. |
| 5,990,812 A | 11/1999 | Bakhmutsky |

(Continued)

FOREIGN PATENT DOCUMENTS

| | | |
|---|---|---|
| CN | 101017574 | 8/2007 |
| JP | 06276394 | 9/1994 |

(Continued)

OTHER PUBLICATIONS

Sullivan et at.; Rate-distortion optimization for video compression; Signal Processing Magazine, IEEE (vol. 15, Issue: 6) Nov. 1998; pp. 74-90; IEEE Xplore.*

(Continued)

*Primary Examiner* — Bradley Holder (57) ABSTRACT

Scalable techniques for dynamic data encoding and decoding are directed toward a system including a plurality of frame processing units. A main frame processing unit manages frame processing unit resource, dispatches frames to appropriate frame processing units. One or more auxiliary frame processing units encode or decode the non-reference frames dispatched by the main frame processing unit. The main frame processing unit encodes or decodes the reference frames and encodes or decodes non-reference frames if none of the auxiliary frame processing units are available.

16 Claims, 8 Drawing Sheets

(56) References Cited

U.S. PATENT DOCUMENTS

| | | | |
|---|---|---|---|
| 6,008,745 A | 12/1999 | Zandi et al. | |
| 6,009,203 A | 12/1999 | Liu et al. | |
| 6,023,088 A | 2/2000 | Son | |
| 6,041,403 A | 3/2000 | Parker et al. | |
| 6,047,357 A | 4/2000 | Bannon et al. | |
| 6,144,322 A | 11/2000 | Sato | |
| 6,157,741 A | 12/2000 | Abe et al. | |
| 6,161,531 A | 12/2000 | Hamburg et al. | |
| 6,246,347 B1 | 6/2001 | Bakhmutsky | |
| 6,298,370 B1 | 10/2001 | Tang et al. | |
| 6,317,063 B1 | 11/2001 | Matsubara | |
| 6,339,658 B1 | 1/2002 | Moccagatta et al. | |
| 6,385,244 B1* | 5/2002 | Morad et al. | 375/240.16 |
| 6,441,757 B1 | 8/2002 | Hirano | |
| 6,456,340 B1 | 9/2002 | Margulis | |
| 6,462,744 B1 | 10/2002 | Mochida et al. | |
| 6,480,489 B1 | 11/2002 | Muller et al. | |
| 6,507,614 B1 | 1/2003 | Li | |
| 6,542,550 B1* | 4/2003 | Schreiber | 375/240.26 |
| 6,543,023 B2 | 4/2003 | Bessios | |
| 6,552,673 B2 | 4/2003 | Webb | |
| 6,563,440 B1 | 5/2003 | Kangas | |
| 6,563,441 B1 | 5/2003 | Gold | |
| 6,577,681 B1 | 6/2003 | Kimura | |
| 6,587,057 B2 | 7/2003 | Scheuermann | |
| 6,621,499 B1* | 9/2003 | Callway | 345/629 |
| 6,654,539 B1 | 11/2003 | Duruoz et al. | |
| 6,675,282 B2 | 1/2004 | Hum et al. | |
| 6,696,992 B1 | 2/2004 | Chu | |
| 6,738,522 B1 | 5/2004 | Hsu et al. | |
| 6,751,259 B2* | 6/2004 | Zhang et al. | 375/240.26 |
| 6,795,503 B2 | 9/2004 | Nakao et al. | |
| 6,839,624 B1 | 1/2005 | Beesley et al. | |
| 6,847,686 B2* | 1/2005 | Morad et al. | 375/240.16 |
| 6,891,976 B2 | 5/2005 | Zheltov et al. | |
| 6,981,073 B2 | 12/2005 | Wang et al. | |
| 7,016,547 B1 | 3/2006 | Smirnov | |
| 7,051,123 B1 | 5/2006 | Baker et al. | |
| 7,068,407 B2 | 6/2006 | Sakai et al. | |
| 7,068,919 B2 | 6/2006 | Ando et al. | |
| 7,069,407 B2 | 6/2006 | Vasudevan et al. | |
| 7,074,153 B2 | 7/2006 | Usoro et al. | |
| 7,113,115 B2 | 9/2006 | Partiwala et al. | |
| 7,113,546 B1 | 9/2006 | Kovacevic et al. | |
| 7,119,813 B1 | 10/2006 | Hollis et al. | |
| 7,129,862 B1 | 10/2006 | Shirdhonkar et al. | |
| 7,132,963 B2 | 11/2006 | Pearlstein et al. | |
| 7,158,539 B2 | 1/2007 | Zhang et al. | |
| 7,209,636 B2 | 4/2007 | Imahashi et al. | |
| 7,230,986 B2 | 6/2007 | Wise et al. | |
| 7,248,740 B2 | 7/2007 | Sullivan | |
| 7,286,543 B2 | 10/2007 | Bass et al. | |
| 7,289,047 B2 | 10/2007 | Nagori | |
| 7,324,026 B2 | 1/2008 | Puri et al. | |
| 7,366,240 B2 | 4/2008 | Chiang Wei Yin et al. | |
| 7,372,378 B2 | 5/2008 | Sriram | |
| 7,372,379 B1 | 5/2008 | Jia et al. | |
| 7,404,645 B2 | 7/2008 | Margulis | |
| 7,432,835 B2 | 10/2008 | Ohashi et al. | |
| 7,496,234 B2 | 2/2009 | Li | |
| 7,606,313 B2 | 10/2009 | Raman et al. | |
| 7,627,042 B2 | 12/2009 | Raman et al. | |
| 7,660,352 B2 | 2/2010 | Yamane et al. | |
| 7,724,827 B2 | 5/2010 | Liang et al. | |
| 7,765,320 B2 | 7/2010 | Vehse et al. | |
| 7,912,298 B2* | 3/2011 | Kato et al. | 382/232 |
| 8,004,569 B2* | 8/2011 | Yu et al. | 348/208.4 |
| 8,009,673 B2* | 8/2011 | Gandal et al. | 370/392 |
| 8,102,399 B2* | 1/2012 | Berman et al. | 345/536 |
| 8,477,852 B2 | 7/2013 | Jia | |
| 8,502,709 B2 | 8/2013 | Jia | |
| 8,849,051 B2 | 9/2014 | Jia | |
| 2001/0010755 A1 | 8/2001 | Ando et al. | |
| 2001/0026585 A1 | 10/2001 | Kumaki | |
| 2002/0063807 A1 | 5/2002 | Margulis | |
| 2002/0085638 A1* | 7/2002 | Morad et al. | 375/240.17 |
| 2002/0094031 A1 | 7/2002 | Ngai et al. | |
| 2002/0135683 A1 | 9/2002 | Tamama et al. | |
| 2003/0043919 A1 | 3/2003 | Haddad | |
| 2003/0067977 A1 | 4/2003 | Chu et al. | |
| 2003/0142105 A1 | 7/2003 | Lavelle et al. | |
| 2003/0156652 A1 | 8/2003 | Wise et al. | |
| 2003/0179706 A1 | 9/2003 | Goetzinger et al. | |
| 2003/0191788 A1 | 10/2003 | Auyeung et al. | |
| 2003/0196040 A1 | 10/2003 | Hosogi et al. | |
| 2004/0028142 A1 | 2/2004 | Kim | |
| 2004/0056787 A1 | 3/2004 | Bossen | |
| 2004/0059770 A1 | 3/2004 | Bossen | |
| 2004/0067043 A1 | 4/2004 | Duruoz et al. | |
| 2004/0081245 A1 | 4/2004 | Deeley et al. | |
| 2004/0096002 A1 | 5/2004 | Zdepski et al. | |
| 2004/0130553 A1 | 7/2004 | Ushida et al. | |
| 2004/0145677 A1 | 7/2004 | Raman et al. | |
| 2004/0158719 A1 | 8/2004 | Lee et al. | |
| 2005/0008331 A1 | 1/2005 | Nishimura et al. | |
| 2005/0021811 A1* | 1/2005 | Roelens | 709/231 |
| 2005/0046700 A1* | 3/2005 | Bracke | 348/218.1 |
| 2005/0123274 A1 | 6/2005 | Crinon et al. | |
| 2005/0147375 A1 | 7/2005 | Kadono | |
| 2005/0182778 A1 | 8/2005 | Heuer et al. | |
| 2005/0207497 A1 | 9/2005 | Rovati et al. | |
| 2006/0013321 A1 | 1/2006 | Sekiguchi et al. | |
| 2006/0056513 A1* | 3/2006 | Shen et al. | 375/240.16 |
| 2006/0056515 A1* | 3/2006 | Kato et al. | 375/240.16 |
| 2006/0067582 A1 | 3/2006 | Bi et al. | |
| 2006/0083306 A1 | 4/2006 | Hsu | |
| 2006/0133500 A1 | 6/2006 | Lee et al. | |
| 2006/0176960 A1 | 8/2006 | Lu et al. | |
| 2006/0215916 A1 | 9/2006 | Kimura | |
| 2006/0256120 A1 | 11/2006 | Ushida et al. | |
| 2006/0271717 A1* | 11/2006 | Koduri et al. | 710/241 |
| 2007/0006060 A1 | 1/2007 | Walker | |
| 2007/0288971 A1 | 12/2007 | Cragun et al. | |
| 2008/0162860 A1 | 7/2008 | Sabbatini et al. | |
| 2008/0240157 A1* | 10/2008 | Muraguchi et al. | 370/470 |
| 2008/0253694 A1* | 10/2008 | Berman et al. | 382/305 |
| 2008/0317138 A1 | 12/2008 | Jia | |
| 2009/0196356 A1 | 8/2009 | Houki | |

FOREIGN PATENT DOCUMENTS

| | | |
|---|---|---|
| JP | 09261647 | 10/1997 |
| JP | 2000049621 | 2/2000 |
| KR | 1020030016859 | 3/2003 |
| TW | 200520535 | 12/2003 |
| TW | 200428879 | 11/2004 |
| WO | 01/24425 | 4/2001 |

OTHER PUBLICATIONS

Roitzsch; Slice-balancing H.264 video encoding for improved scalability of multicore decoding; Proceeding EMSOFT '07 Proceedings of the 7th ACM & IEEE international conference on Embedded software 2007, pp. 269-278; ACM Digital Library.*

Miska Hannuksela, Picture Decoding Method, USPTO Provisional Application filed Feb. 18, 2003; U.S. Appl. No. 60/448,189.

Ting-Kun Yeh et. al, Video Decoder, USPTO Provisional Application filed Dec. 3, 2003; U.S. Appl. No. 60/526,294.

English Translation of Office Action for Chinese Patent Application No. 200810212373.X, Entitled: Decoding Variable Length Codes in JPEG Applications.

* cited by examiner

TECHNIQUES FOR SCALABLE DYNAMIC DATA ENCODING AND DECODING

BACKGROUND OF THE INVENTION

Data compression is used extensively in modern computing devices. The use of data compression in computing devices includes video compression, audio compression, and the like. Compression reduces the quantity of data used to represent digital video images, audio file and the like.

Video compression typically operates on groups of neighboring pixels referred to as macroblocks. The macroblocks are compared from one frame to the next and the video compression codec generates a difference within those blocks. The compressed video may then be transmitted and/or stored as a series of reference frames encoding the macroblocks of a particular frame and one or more non-reference frames encoding the macroblock differences between the reference frame and another reference or non-reference frame. The difference between a reference frame and non-reference frame is whether any following frame will use it as a reference.

The frames of audio and video data are sequential and therefore encoding and decoding the compressed data can be done sequentially. The encoding and decoding, however, is typically computationally intensive causing processing latency, needing high communication bandwidth and/or large amounts of memory. Accordingly, there is a continued need for improved techniques for encoding and decoding video data, audio data and the like.

SUMMARY OF THE INVENTION

Embodiments of the present technology are directed toward scalable dynamic data encoding and decoding. In one embodiment, an encoding or decoding method includes receiving a frame based data stream. The type of each given frame is determined. If the given frame of data is a reference frame, the frame is encoded or decoded by a main frame processing unit. If the given frame of data is not a reference frame, a determination as to whether an auxiliary frame processing unit is available for decoding the given frame of data. If the given frame of data is not a reference frame and a given auxiliary frame processing unit is available, the frame is encoded or decoded by a given auxiliary frame processing unit. If the given frame of data is not a reference frame and no auxiliary frame processing unit is available, the frame is encoded or decoded by the main frame processing unit.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Most conventional parallel computing efforts have been directed at or below the macro-block processing level. However, in conventional computer architectures, a single computing device has more and more computing resources that are available to perform other tasks than what they originally were targeted for. This makes system level or frame/slice level parallelism possible. For example, a typical computing device may include a central processing unit (CPU) or multi-core CPU, a graphics processing unit (GPU), and/or dedicated video decoding hardware. The GPU which was originally targeted to render graphics, may be used to also perform video decoding. Based on real-time usage, one or more of the plurality of computing resources can be dynamically utilized to perform a computation-intensive task together in parallel.

Figure 1:
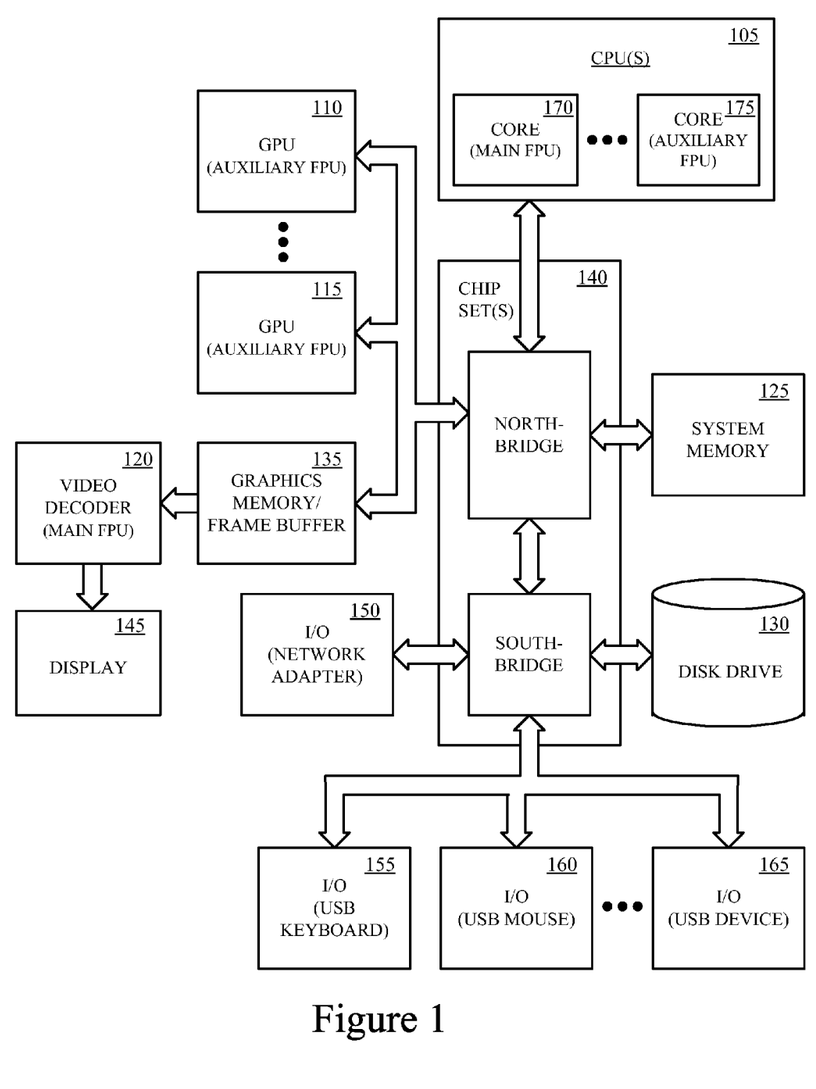
FIG. 1 shows a block diagram of an exemplary computing device for implementing embodiments of the present technology.

Referring now to FIG. 1, an exemplary computing device for implementing embodiments of the present technology is shown. The exemplary computing device may include one or more central processing units 105, one or more graphics processing units 110, 115, a dedicated hardware video decoder 120, volatile and/or non-volatile memory (e.g., computer readable media) 125-135, one or more chip sets 140, and one or more peripheral devices 145-165 communicatively coupled by one or more busses. The CPUs 105 may each include one or more cores 170, 175. Likewise, the GPUs 110, 115 may also each include one or more cores. The I/O device 145-165 may include a network adapter (e.g., Ethernet card) 150, CD drive, DVD drive and/or the like, and peripherals such as a display 145, a keyboard 155, a pointing device 160, a speaker, a printer, and/or the like.

A frame processing unit (FPU) as used herein is any computing resource which can perform frame based data encoding and/or decoding. A FPU can be a dedicated encoder and/or decoder (e.g., codec) 120, a CPU 105 or CPU core 170 plus necessary software running on it, or a GPU or GPU core plus necessary software running on it. Due to the sequential nature of video frame decoding, any sequential-execution hardware processing unit is counted as one FPU. In one implementation, the FPU may be a video frame processing unit (VFPU), audio frame processing unit, audio/video frame processing unit and/or the like.

In a typical computing device, there is one FPU which is referred to herein as the main FPU 170. The other units are referred to herein as auxiliary FPUs 110, 115, 120, 175. The main FPU 170 provides for resource management, bit stream dispatching, reference frame encoding or decoding, and other logic controls. It can be a combination of a dedicated hard-wired encoder and/or decoder and a small portion of software running on a CPU core 170. In one implementation, when there is a dedicated FPU (e.g., video decoder 120), it is usually used as the main FPU in connection with the CPU or one of the CPU cores 170. The dedicated FPU is used because the dedicated decoder is likely faster than general purpose processors such as a CPU, CPU core, GPU, GPU core or the like. The task of the main FPU is to decode reference frames and manage system resources dynamically (e.g., dispatching non-reference frames to auxiliary FPUs). An allocated auxiliary FPU 110, 115, 120, 175 receives a bit stream and encodes or decodes it.

Figure 2A:
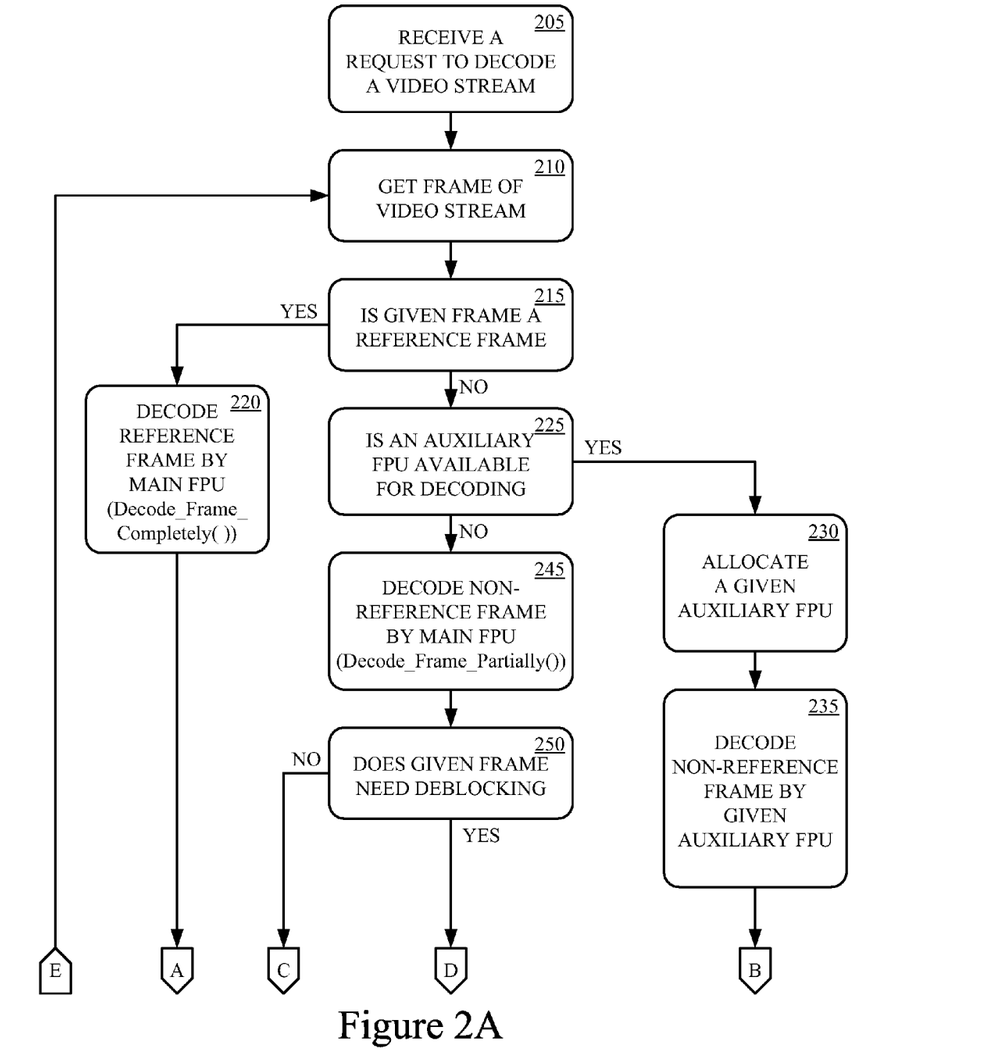
FIGS. 2A and 2B show a flow diagram of a scalable method of dynamic decoding a data stream, in accordance with one embodiment of the present technology.
Figure 2B:
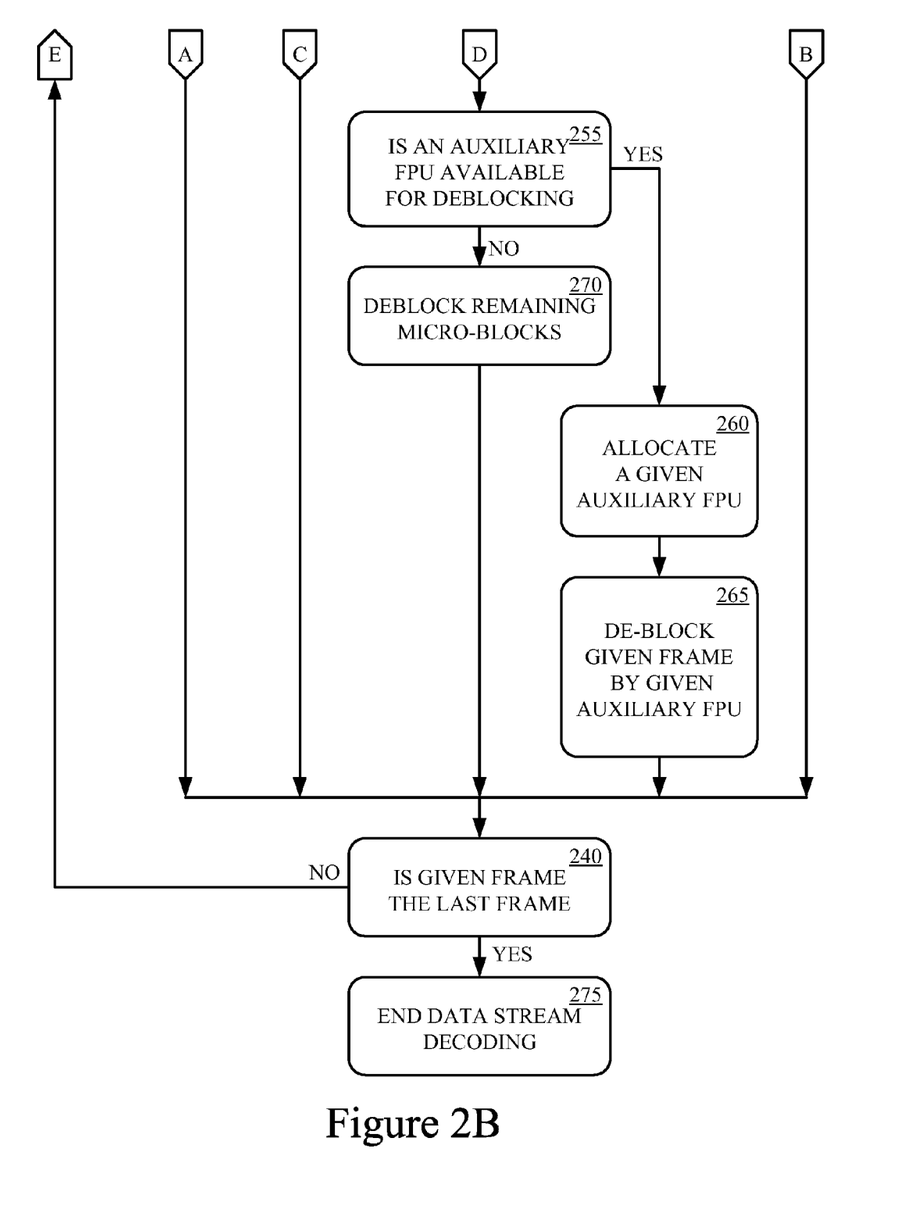

The techniques for scalable dynamic encoding and decoding described herein do not use fixed system resources. Instead, the technique allocates FPUs based on real-time usage. Referring now to FIGS. 2A and 2B, a scalable method of dynamic decoding a data stream, in accordance with one embodiment of the present technology, is shown. The method begins at 205 with receiving a request to decode a frame based data stream. The data stream may be a video data stream, audio data stream, audio/video data stream, or the like. At 210, a given frame of a bit stream is accessed. At 215, the type of frame is determined. In one implementation, the frames may be reference frames such as intra-coded frames (I) or predicted frames (P), or the frames may be bi-directional predicted frames (B). If the given frame is a reference frame, the process continues at 220 with decoding the given reference frame by the main FPU. In one implementation, the frame is decoded by the main FPU by a call to a routine (Decode_Frame_Completely( )) for frame decoding and on-spot deblocking of a H.264data stream. Decoding of reference frames is performed sequentially. The reference frames are decoded by the main FPU because the reference frames need to be decoded before other reference frames that depend upon it are decoded. If the given frame is not a reference frame, the main FPU determines if an auxiliary FPU is available, at 225.

If an auxiliary FPU is available, the given non-reference frame is allocated to the given available auxiliary FPU, at 230. At 235, the given available auxiliary FPU decodes the given non-reference frame. After the given non-reference frame is dispatched to the auxiliary FPU, the process continues with the main FPU determining if the given frame is the last frame, at 240. Although the reference frames need to be decoded sequentially, the non-reference frames can be decoded in parallel because no other reference frames depend on them.

If an auxiliary FPU is not available, the given non-reference frame is decoded by the main FPU, at 245. The non-reference frame may be decoded partially as described below with respect to FIG. 5. At 250, the main FPU determine if the given non-reference frame needs deblocking. If the given non-reference frame does not need beblocking, the process continues with the main FPU determining if the given frame is the last frame, at 240.

If one or more macroblocks of the given non-reference frame needs deblocking, the main FPU determines if an auxiliary FPU is available, at 255. If an auxiliary FPU is available, one or more macroblocks of the given non-reference frame are allocated to the given available FPU for deblocking, at 260. At 265, the given available FPU deblocks the one or more macroblocks of the given non-reference frame. After the macroblocks of the given non-reference frame are dispatched to the available FPU, the process continues with the main FPU determining if the given frame is the last frame, at 240.

If an auxiliary FPU is not available, the one or more macroblocks of the given non-reference frame are deblocked by the main FPU, at 270. After the macroblocks of the given non-reference frame are deblocked, the process continues with the main FPU determining if the given frame is the last frame, at 240.

If the main FPU determines that the given frame is the last frame, decoding of the requested data stream is complete, at 275. If the given frame is not the last frame, the process continues with getting a next frame of the bit stream, at 210.

Figure 3:
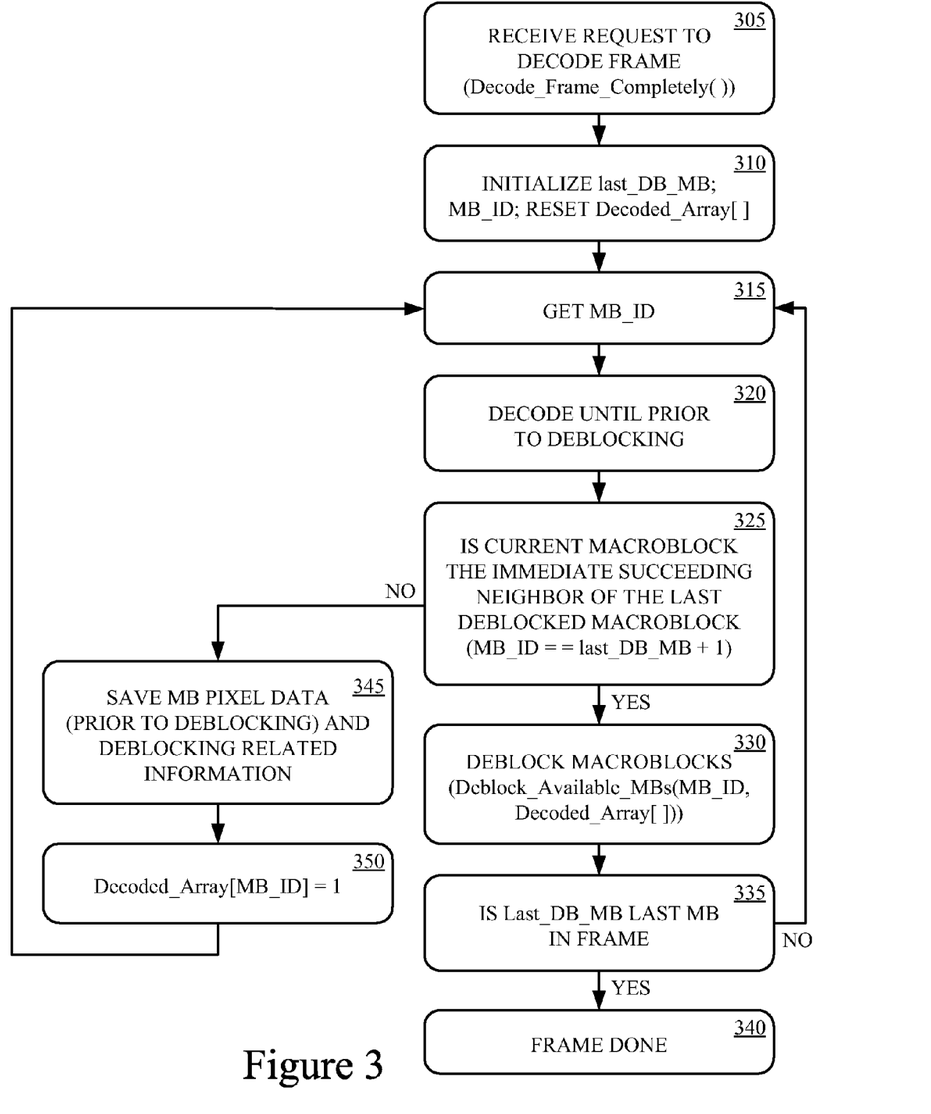
FIG. 3 shows a flow diagram of a method of decoding and deblocking macroblocks, in accordance with one embodiment of the present technology.

It is appreciated that, in accordance with the above described method, all reference frames are decoded by the main FPU, due to the nature of the sequential processing of video decoding and the like. For an H.264 video streams, an on-spot deblocking method, as discussed below with respect to FIG. 3, is used to speed up decoding time, and reduce bandwidth consumption and memory size. When it comes to non-reference frame decoding, an auxiliary FPU is allocated, if available, for decoding. In this way, the main FPU can move to a next frame, as long as other resources are available (such as memory to store frame pixel data). If there is no auxiliary FPU available when it is needed, the main FPU will decode the non-reference frame, but with only in-order macroblock deblocking, as discussed below with respect to FIGS. 5A and 5B.

If the computing system has only one FPU, the FPU will do the conventional sequential decoding without sacrificing performance. If the computing system includes an auxiliary FPU that is available when a video decoding process needs it, parallel processing takes place and performance is improved. In typical cases, non-reference frames are the majority in a video stream. For example, one typically frame sequence in display order may be I, B, B, P, B, B, P, B, B, P, B, B, P, B, B, P . . . , where I's and P's are reference frames and B's are non-reference frames. By sending B's to one or more auxiliary FPUs and decoding them in parallel, the performance is significantly improved.

Referring now to FIG. 3, a method of decoding and deblocking macroblocks, in accordance with one embodiment of the present technology, is shown. The method begins, at 305, when a routine for decoding of the given frame of data is called at 220 as discussed above with regard to FIGS. 2A and 2B. At 310, a variable for identifying the last deblocked macroblock may be initialized. In one implementation, a variable "last_DB_MB is initialized to a value of −1 (negative one). At 315, an identifier of the current macroblock to be deblocked is accessed. In one implementation, the macroblock number 'MB_ID' of the current macroblock is accessed. At 320, the main FPU decode the current macroblock until prior to deblocking. At 325, the main FPU determines whether the macroblocks are being received in-order or out-of-order and whether the immediately proceeding macroblock was completely decoded. In one implementation, the value of the MB_ID is compared to the value of last_DB_MB. In one implementation, the current macroblock is received in order and the immediately proceeding macroblock was completely decoded if the value of MB_ID is equal to last_DB_MB+1.

If the current macroblock was received in-order and the immediately proceeding macroblock was completely decoded, then the current macroblock is deblocked at 330. In one implementation, the current macroblock is deblocked by calling a routine (Deblock_Available_MBs) for deblocking consecutive available macroblocks as described below with respect to FIG. 4. At 335, the main FPU determines if the current macroblock is the last macroblock. If the current macroblock is not the last macroblock in the frame, then the process continues at 315. If the current macroblock is the last macroblock in the frame then the process is done at 340. In one implementation, the routine returns to process 240 as describe above with regard to FIGS. 2A and 2B.

If the current macroblock was received out-of-order or the immediately proceeding macroblock was not completely decoded, then the current decoded macroblock data is stored, at 345. At 350, the current macroblock is flagged as being decoded but not deblocked, if the current macroblock was received out-of-order or the immediately proceeding macroblock was not completely decoded. In one implementation, a bit value corresponding to the current macroblock is set in the macroblock array. After the current macroblock is flagged as being decoded but not deblocked, the process returns to 315.

The on-spot deblocking method tries to deblock macroblocks as soon as possible. This is very useful for ASO/FMO frames of H.264 and the like. When a macroblock is decoded and it can be deblocked, it will be deblocked and the following consecutive macroblocks, which are decoded but not deblocked, will be deblocked as well. This makes it possible for the next decoded macroblock to be deblocked. Therefore, the data coming out of the motion compensation module doesn't have to be stored and loaded back for deblocking. At the same time, the technique doesn't sacrifice performance for in-order slice/frame decoding.

The techniques described herein achieve on-spot deblocking for a good portion of the macroblocks. Because the macroblock data are already in the working buffer, they don't need to be saved and reloaded. Therefore, traffic on the data bus is reduced and bandwidth requirement is eased. At the same time, memory used to store intermediate data is also reduced because the data does not need to be stored in memory. As an immediate result, the performance is improved.

Figure 4:
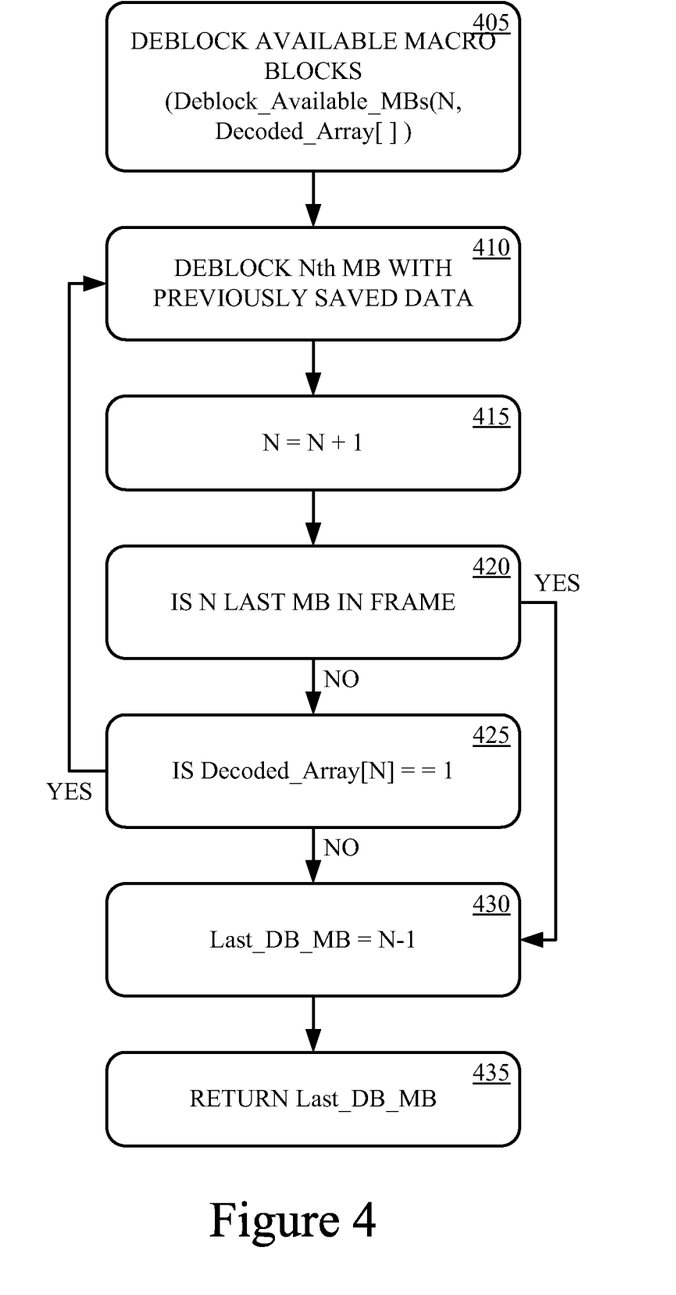
FIG. 4 shows a flow diagram of a method of deblocking consecutive available macroblocks in accordance with another embodiment of the present technology.

Referring now to FIG. 4, a method of deblocking consecutive available macroblocks in accordance with another embodiment of the present technology is shown. The method begins, at 405, when a routine for deblocking macroblocks is called at 330 as discussed above with regard to FIG. 3. At 410, the Nth macroblock in the frame is deblocked and other macroblocks that are eligible for deblocking are identified. After the current macroblock, other consecutive macroblocks may also be deblocked. The other eligible macroblocks are retrieved from storage and may be deblocked using one or more auxiliary FPUs. In one implementation, the macroblock M+1 that immediately follows the current macroblock M in encoding order can also be deblocked if macroblock M+1 has previously been decoded but not deblocked, and stored. Once macroblock M+1 is deblocked, the macroblock M+2 that immediately follows macroblock M+1 in encoded order can be deblocked if it has been previously decoded but not deblocked, stored, and so on. In one implementation, each macroblock that is eligible for deblocking is flagged in a macroblock array. In one implementation, the current macroblock M is the last macroblock in the frame if M is the largest MB_ID in the frame. In one implementation, the information about the Nth macroblock and other consecutive macroblocks, that were stored at 345 as discussed above with regard to FIG. 3, is accessed. At 415, an identifier of the current macroblock is incremented. If the current value of the identifier of the current macroblock is greater than the macroblock number of the last macroblock in the frame at 420, then the process advances to 430.

If the current value of the identifier of the current macroblock is not greater than the macroblock number of the last macroblock in the frame, then the main FPU determines if the current macroblock can be deblocked, at 425. If it is determined that the macroblock can be deblocked, then it is deblocked at process 410 In one implementation, the bit value in the array corresponding to the current macroblock is read. If the bit value is set (e.g., equal to one), then the current macroblock can be deblocked. If the current macroblock cannot be deblocked, then the value of last_DB_MB is set to the current value of N decremented by one (N−1) at 430, and the value of last_DB_MB is returned and utilized as described above in conjunction with FIG. 3.

Thus, according to the above described methods, macroblocks can be deblocked as soon as they are eligible to be deblocked. On-spot deblocking can be achieved for some macroblocks that are in an out-of-order (e.g., arbitrary slice ordering (ASO), flexible macroblock ordering (FMO)) frame. Accordingly, the amount of bus traffic can be reduced because it is not necessary to transfer all macroblocks in such a frame to and from memory, and the amount of memory consumed is also reduced. Furthermore, computing time can be reduced because decoding and deblocking can be accomplished in parallel—while one macroblock is being decoded, another macroblock can be deblocked.

Figure 5A:
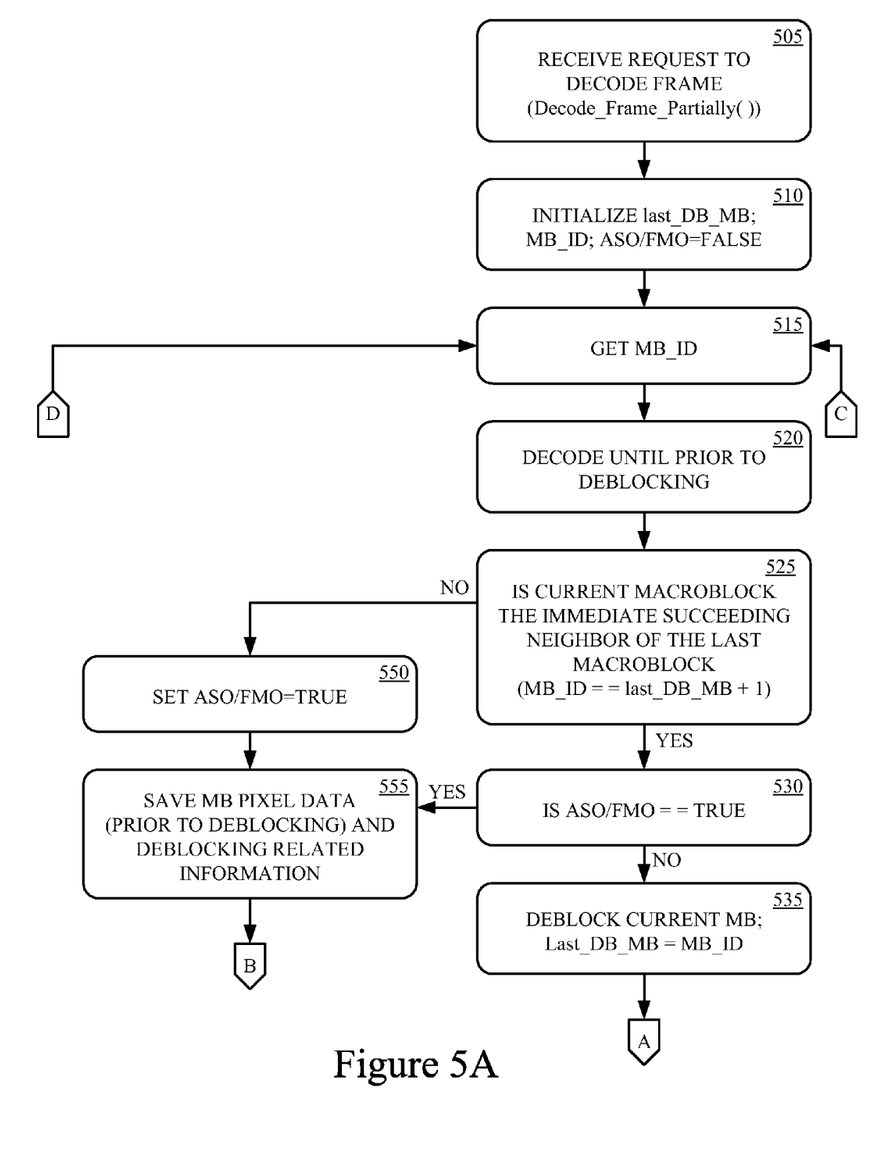
FIGS. 5A and 5B show a flow diagram of a method of decoding and deblocking macroblocks, in accordance with one embodiment of the present technology.
Figure 5B:
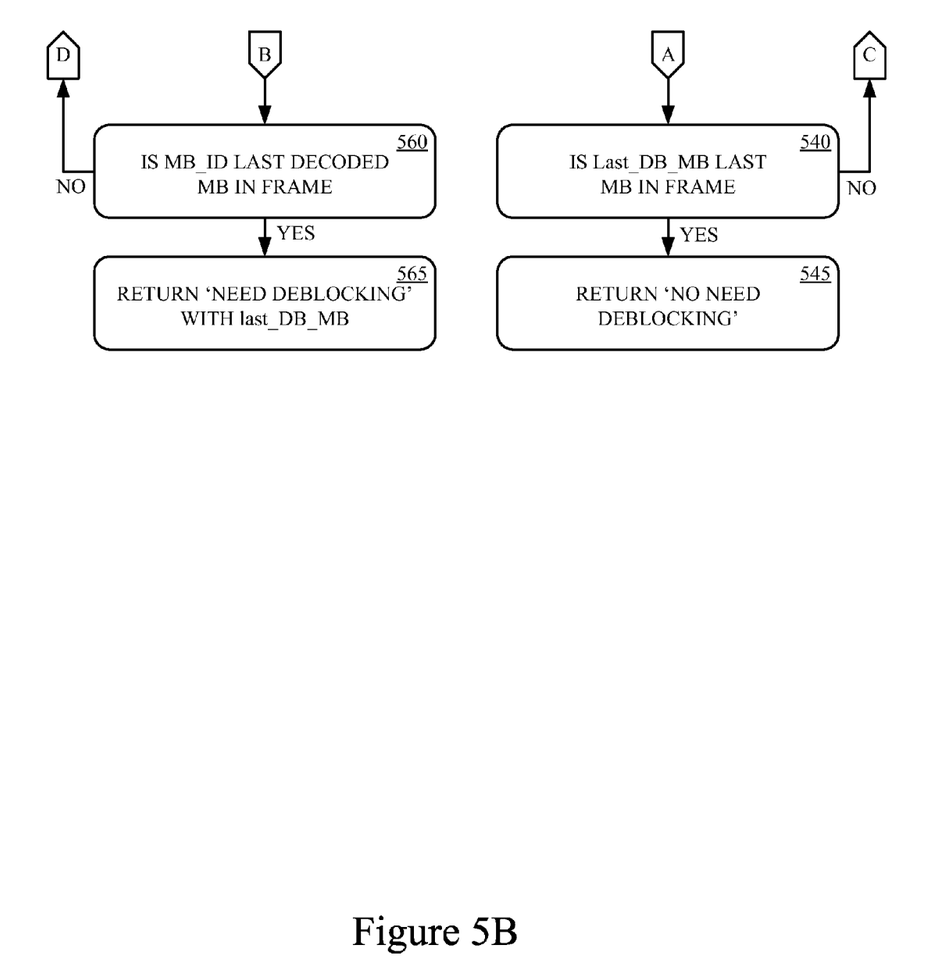

Referring now to FIGS. 5A and 5B, a method of decoding and deblocking macroblocks, in accordance with one embodiment of the present technology, is shown. The method begins, at 505, when a routine for decoding of the given frame of data is called at 245 as discussed above with regard to FIGS. 2A and 2B. At 510, a variable for identifying the last deblocked macroblock may be initialized. In one implementation, a variable "last_DB_MB is initialized to a value of −1 (negative one). In addition, a flag indicating whether the frame is an ASO or FMO may be cleared. At 515, an identifier of the current macroblock to be deblocked is accessed. In one implementation, the macroblock number 'MB_ID' of the current macroblock is accessed. At 520, the macroblock is decoded until prior to deblocking. At 525, the main FPU determines whether the macroblocks are being received in-order or out-of-order and whether the immediately proceeding macroblock was completely decoded. In one implementation, the value of the MB_ID is compared to the value of last_DB_MB. In one implementation, the current macroblock is received in order if the value of MB_ID is equal to last_DB_MB+1.

If the current macroblock was received in-order, it is determined whether the frame is an ASO or FMO frame, at 530. In one implementation, the flag indicating weather the frame is an ASO or FMO is checked to see if it is set. If the current macroblock was received in-order and is not an ASO or FMO frame, then the current macroblock is deblocked, at 535. After the current macroblock is deblocked, it is determined if the current macroblock is the last macroblock, at 540. If the current macroblock is not the last macroblock in the frame, then the process continues at 515. If the current macroblock is the last macroblock in the frame, then the process returns an indication that there is 'no need for deblocking,' at 545. In one implementation, the routine returns to process 250 as describe above with regard to FIGS. 2A and 2B.

If the current macroblock was received out-of-order, then the flag indicating that the frame is an ASO or FMO may be set, at 550. At 555, the current decoded macroblock data is stored prior to deblocking along with storing deblocking related information, if the current macroblock was received out-of-order or the frame is an ASO or FMO frame. At 560, it is determined if the current macroblock is the last decoded macroblock in the frame. If the current macroblock is not the last decoded macroblock in the frame, then the process continues at 515. If the current macroblock is the last decoded macroblock in the frame, then the process returns an indication that macroblocks 'need deblocking' and the identifier of the last deblocked macroblock, at 565. In one implementation, the routine returns to process 250 as describe above with regard to FIGS. 2A and 2B.

Figure 6:
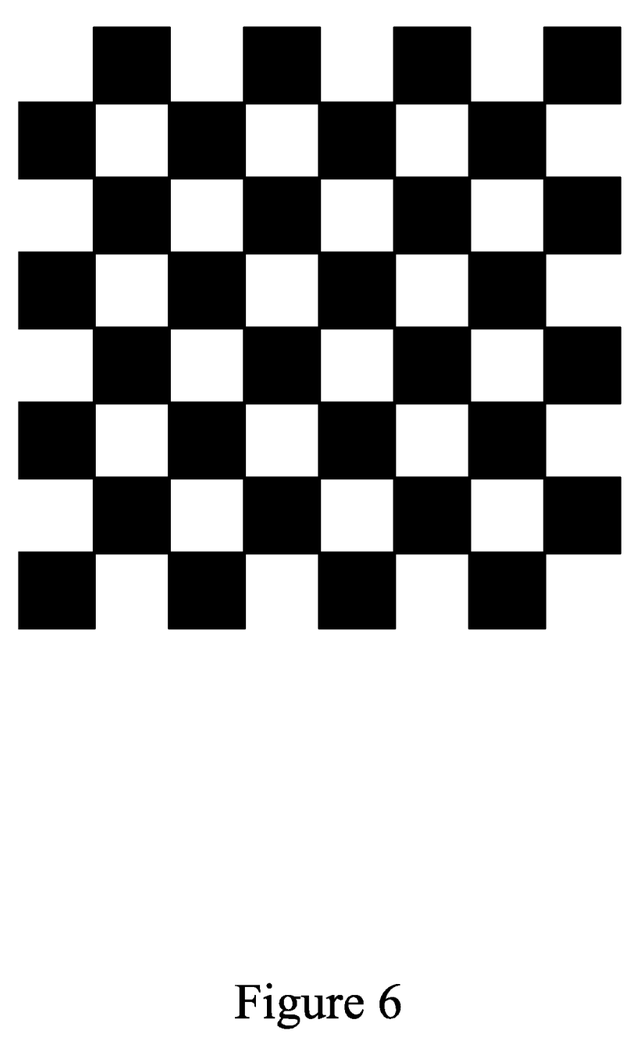
FIG. 6 shows an illustration of a macroblock mapping of a typical flexible macroblock ordering (FMO).

Referring now to FIG. 6, an exemplary macroblock mapping of a typical FMO case is shown. The exemplary macroblock mapping may be characterized by a chess board pattern. The macroblock in black positions belong to one slice, while white ones make up another slice. During the decoding of the first slice (say white one), at most one macroblock can be deblocked and the rest have to be stored in a temporary place. In the processing of the second slice (black ones), every macroblock in the second slice can be deblocked immediately after it is decoded by the motion compensation module, because deblocking module keeps on deblocking available consecutive macroblocks and thus makes deblocking possible for the next decoded macroblock. Therefore memory is only needed to store half of the frame data (e.g., the first slice). The bandwidth consumption to store and reload macroblock data is also cut by almost half.

The techniques described herein advantageously turn sequential processing of frame based data steams and the like to parallel computing by utilizing available computing resources. The native sequential processing is done in sequence. At the same time, tasks are split into sub-tasks which can be processed in parallel. If there is any parallel processing resource available, it is utilized to process the sub-task.

Furthermore, dynamic computing resource management is introduced to make use of every possible resource. With modern computer system, this speeds up encoding and decoding significantly. This design can be used on any computer system and is fully scalable. The scalable dynamic technique can be used for any video, audio, imaging or the like task (e.g., encoding and/or decoding).

The on-spot deblocking technique realizes on-the-fly ASO/FMO detection for the H.264 video decoding protocol, and also improves the decoding speed, eases bandwidth consumption and memory storage size requirements.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the Claims appended hereto and their equivalents.

What is claimed is:

1. A computer implemented method comprising:
   receiving, by a processor, a given frame of data;
   determining if the given frame of data is a reference frame;
   decoding the given frame of data by a main frame processing unit if the given frame of data is a reference frame:
   determining if an auxiliary frame processing unit is available for decoding the given frame of data if the given frame of data is not a reference frame;
   decoding the given frame of data by a given auxiliary frame processing unit and not the main frame processing unit if the given frame of data is not a reference frame and the given auxiliary frame processing unit is available;
   decoding the given frame of data by the main frame processing unit and not the given auxiliary frame processing unit if the given frame of data is not a reference frame and no auxiliary frame processing unit is available;
   determining if the given frame of data needs deblocking;
   determining if an auxiliary frame processing unit is available for deblocking the given frame of data;
   deblocking the given frame of data by a given auxiliary frame processing unit if the given auxiliary frame processing unit is available; and
   deblocking the given frame of data by the main frame processing unit if no auxiliary frame processing unit is available.

2. The computer implemented method according to claim 1, wherein the frame of data comprises a frame of video data.

3. The computer implemented method according to claim 1, wherein the frame of data comprises a frame of audio data.

4. The computer implemented method according to claim 1, wherein deblocking the given frame of data by the given auxiliary frame processing unit comprises in-order macroblock deblocking.

5. The computer implemented method according to claim 1, wherein deblocking the given frame of data by the main frame processing unit comprises on-spot macroblock deblocking.

6. The computer implemented method according to claim 5, wherein on-spot macroblock deblocking includes deblocking consecutive available macroblocks.

7. One or more non-transitory computing device readable media storing one or more computing device executable instructions which when executed by a processing unit perform a process comprising:
   receiving a given frame of data;
   determining if the given frame of data is a reference frame;
   determining if an auxiliary frame processing unit is available for decoding the given frame of data if the given frame of data is not a reference frame;
   decoding the given frame of data by a given auxiliary frame processing unit and not the main frame processing unit if the given frame of data is not a reference frame and the given auxiliary frame processing unit is available;
   decoding the given frame of data by a main frame processing unit if the given frame of data is a reference frame, or by the main frame processing unit and not the given auxiliary frame processing unit if the given frame of data is not a reference frame and no auxiliary frame processing unit is available;
   determining if the given frame of data needs deblocking;
   determining if an auxiliary frame in processing unit is available for deblocking the given frame of data;
   deblocking the given frame of data by a given auxiliary frame processing unit if the given auxiliary frame processing unit is available; and
   deblocking the given frame of data by the main frame processing unit if no auxiliary frame processing unit is available.

8. The one or more non-transitory computing device readable media storing one or more computing device executable instructions which when executed by a processing unit perform a process according to claim 7, wherein deblocking the given frame of data by the given auxiliary frame processing unit comprises in-order macroblock deblocking.

9. The one or more non-transitory computing device readable media storing one or more computing device executable instructions which when executed by a processing unit perform a process according to claim 7, wherein deblocking the given frame of data by the main frame processing unit comprises on-spot macroblock deblocking.

10. The one or more non-transitory computing device readable media storing one or more computing device executable instructions which when executed by a processing unit perform a process according to claim 9, wherein on-spot macroblock deblocking includes deblocking consecutive available macroblocks.

11. The one or more non-transitory computing device readable media storing one or more computing device executable instructions which when executed by a processing unit perform a process according to claim 7, wherein the main frame processing unit manages auxiliary frame processing unit resources and dispatches one or more frames.

12. A system comprising:
a main frame processing unit for,
  managing a resource of one or more frame processing units, dispatching frames of a bit stream to the one or more frame processing units, decoding reference frames,
  encoding reference frames and encoding non-reference frames if one or more auxiliary frame processing units are not available, and
  deblocking macroblocks of reference and non-reference frames if the one or more auxiliary frame processing units are not available;
one or more auxiliary frame processing units for,
  decoding non-reference frames,
  encoding non-reference frames, and
  deblocking macroblocks of reference and non-reference frames; and
wherein the frame processing units are each implemented in respective hardware that perform the recited respective one or more functions or a combination of hardware processing unit and processing unit executable instructions stored in non-transitory processing unit executable storage media which when executed by the processing unit perform the recited respective one or more functions, and
wherein the frame processing unit includes the main frame processing unit and the one or more auxiliary frame processing units.

13. The system of claim 12, wherein the main frame processing unit decodes non-reference frames if the one or more auxiliary frame processing units are not available.

14. The system of claim 12, wherein the main frame processing unit and the one or more auxiliary frame processing units are video frame processing units.

15. The system of claim 12, wherein the main frame processing unit and the one or more auxiliary frame processing units are audio frame processing units.

16. The system of claim 12, wherein the main frame processing unit and the one or more auxiliary frame processing units are audio/video frame processing units.

\* \* \* \* \*